United States Patent
Zhang et al.

(10) Patent No.: US 11,817,620 B2
(45) Date of Patent: Nov. 14, 2023

(54) METHOD AND APPARATUS FOR ADJUSTING ANTENNA RADIATION POWER AND ELECTRONIC DEVICE

(71) Applicant: BEIJING XIAOMI MOBILE SOFTWARE CO., LTD., Beijing (CN)

(72) Inventors: Hua Zhang, Beijing (CN); Xin Liu, Beijing (CN); Shui Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 294 days.

(21) Appl. No.: 17/204,069

(22) Filed: Mar. 17, 2021

(65) Prior Publication Data
US 2022/0029275 A1 Jan. 27, 2022

(30) Foreign Application Priority Data
Jul. 27, 2020 (CN) .......................... 202010731805.9

(51) Int. Cl.
*H01Q 17/00* (2006.01)
*H01Q 1/24* (2006.01)
*H04B 1/3827* (2015.01)
*H04W 52/14* (2009.01)
*H04W 52/22* (2009.01)

(52) U.S. Cl.
CPC .......... *H01Q 1/245* (2013.01); *H04B 1/3838* (2013.01); *H04W 52/146* (2013.01); *H04W 52/226* (2013.01)

(58) Field of Classification Search
CPC ........... H04W 4/38; H01Q 9/04; H01Q 21/00; H01Q 17/00; H01Q 7/00; H01Q 25/00
See application file for complete search history.

(56) References Cited

U.S. PATENT DOCUMENTS

2020/0195290 A1* 6/2020 Khawand ............ H04W 52/226

* cited by examiner

*Primary Examiner* — Tu X Nguyen
(74) *Attorney, Agent, or Firm* — COZEN O'CONNOR (57) ABSTRACT

A method and an apparatus for adjusting antenna radiation power includes adjusting antenna radiation power includes: acquiring a power index identification of a triggered SAR sensor group; acquiring target radiation power corresponding to the power index identification according to a first mapping relationship; and determining a corresponding radiator according to a second mapping relationship and the SAR sensor group and adjusting radiation power of the radiator into the target radiation power. The method and apparatus may be incorporated in an electronic device.

15 Claims, 5 Drawing Sheets

--- acquiring a power index identification of a triggered SAR sensor group — 101 acquiring target radiation power corresponding to the power index identification according to a first mapping relationship — 102 determining a corresponding radiator according to a second mapping relationship and the SAR sensor group and adjusting radiation power of the radiator into the target radiation power — 103

METHOD AND APPARATUS FOR ADJUSTING ANTENNA RADIATION POWER AND ELECTRONIC DEVICE

CROSS-REFERENCE TO RELATED APPLICATION

This application is based on and claims priority to Chinese Patent Application Serial No. 202010731805.9, filed on Jul. 27, 2020, the entire contents of which are incorporated herein by reference.

TECHNICAL FIELD

The present disclosure relates to network terminals, and more particularly, to a method and an apparatus for adjusting antenna radiation power and an electronic device incorporating the apparatus.

BACKGROUND

Currently, with the continuous development of 5G communication technology, many of electronic devices on the market and the electronic devices that will be launched in the future are equipped with 5G communication functions. In order to realize 5G communication with the electronic devices, the number of antennas that need to be configured in the electronic devices also increases accordingly. Therefore, there is an interest in ensuring that the electromagnetic radiation absorption ratio of the electronic devices is within an allowable range.

SUMMARY

According to a first aspect of embodiments of the present disclosure, there is provided a method for adjusting antenna radiation power, including: acquiring a power index identification of a triggered SAR sensor group; acquiring target radiation power corresponding to the power index identification according to a first mapping relationship; and determining a corresponding radiator according to a second mapping relationship and the SAR sensor group and adjusting radiation power of the radiator into the target radiation power.

According to a second aspect of embodiments of the present disclosure, there is provided a computer readable storage medium stored therein with computer instructions. When the computer instructions are executed by a processor, steps in the method as described in any of above embodiments are implemented.

According to a third aspect of embodiments of the present disclosure, there is provided an electronic device. The electronic device includes a processor and a memory configured to store instructions executable by the processor. The processor is configured to implement steps in the method as described in any of above embodiments.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terms used in the present disclosure are only for the purpose of describing specific embodiments, and are not intended to limit the present disclosure. The singular forms "a", "said" and "the" used in the present disclosure and appended claims are also intended to include plural forms, unless the context clearly indicates other meanings. It should also be understood that the term "and/or" used herein refers to and includes any or all possible combinations of one or more associated listed items.

It should be understood that although the terms first, second, third, etc. may be used in this disclosure to describe various information, the information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "while" or "when" or "in response to determination".

Currently, with the continuous development of 5G communication technology, some of electronic devices on the market and the electronic devices that will be launched later are all equipped with 5G communication functions. In order to realize 5G communication of the electronic devices, the number of antennas that need to be configured in the electronic devices also increases accordingly. In a related technology, a SAR (Specific Absorption Rate) sensor can be arranged near one or more antennas in an electronic device, and radiation efficiency of all antennas in the electronic device can be adjusted after the SAR sensor is triggered. In this way, the distance between some radiators in the electronic device and the user is made to be sufficient. However, in a case that a SAR value can meet the industry standard, reducing the radiation efficiency of some radiators is not beneficial to communication efficiency of the electronic device.

In another related technology, in order to solve the aforementioned problems, multiple SAR sensors are arranged in the electronic device, each SAR sensor includes triggered state and non-triggered state, and the triggered state can include trigger situations at different distances. In order to cover all possible application scenarios, various combinations of the multiple SAR sensors and target radiated power will be pre-stored in the electronic device. For example, in the case that three SAR sensors are arranged and each SAR sensor includes the triggered state and the non-triggered state at three different distances, then there may be 4*4*4=64 combinations and it is necessary to configure a corresponding power index identification and target radiation power corresponding to the power index identification for each combination of the 64 combinations, causing pre-stored data is too big, a large storage space is required, and configuration workload and testing workload in early stage increase.

Figure 1:
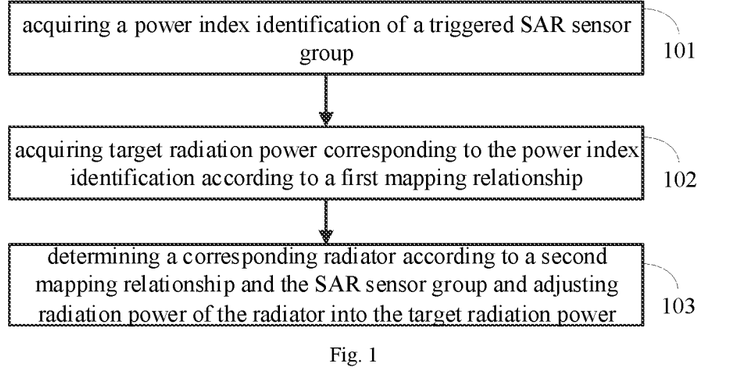
FIG. 1 is a flow chart showing a method for adjusting antenna radiation power according to an exemplary embodiment.

Therefore, in order to solve the above technical problems, as illustrated in FIG. 1, the present disclosure provides a method for adjusting antenna radiation power. The method is applied to a terminal and may include the following steps.

At step 101, a power index identification of a triggered SAR sensor group is acquired.

For example, a power index identification array can be pre-stored in the electronic device. The power index identification array includes multiple non-repeated power index identifications, each SAR sensor group can correspond to an identification bit, and each identification bit can correspond to a unique power index identification in the power index identification array. Accordingly, the identification bit of the triggered SAR sensor group can be acquired first, then the unique power index identification is determined in the power index identification array according to the identification bit, and the target radiation power corresponding to the triggered SAR sensor group can be determined according to a first mapping relationship between the power index identification and the target radiation power.

In some cases, in order to improve communication efficiency of the electronic devices, it is generally desirable to radiate a signal with maximum radiation power. But in other cases, such as when the user is close enough to the electronic device, it can cause the SAR value to be too large. Therefore, in order to avoid an excessive SAR value from causing radiation effects on the human body, the SAR sensor will be triggered when it detects the distance between the human body and the electronic device, to instruct a control end to adjust the radiation power. Specifically, in an embodiment, each SAR sensor group may include one SAR sensor, and the power index identification can be acquired according to the identification bit of the triggered SAR sensor in the SAR sensor group. In a case that a plurality of SAR sensors in the same SAR sensor group are triggered, multiple states of triggered state and the non-triggered state of each SAR sensor at the different distance thresholds can be used as a single variable to set the corresponding identification bit.

The corresponding identification bit can be acquired according to each triggered SAR sensor, and then the radiation power of the radiator can be adjusted according to the average value of the acquired target radiation power or according to the minimum radiation power of the acquired target radiation power.

Further, each SAR sensor may include one or more distance thresholds that can be triggered, and each distance threshold may correspond to an identification bit. Therefore, according to the distance threshold of the triggered SAR sensor of at least one SAR sensor, the identification bit corresponding to the distance threshold can be acquired, and then the corresponding power index identification can be acquired. In this way, it can be avoided that, the radiation power of the radiator is adjusted to be too small in the case that the distance is larger, and it can also be avoided that, the radiation power of the radiator is adjusted to be too large, which causes the SAR value to exceed the standard, when the distance is smaller.

When the above at least one SAR sensor is not triggered, it can be considered that the distance between the electronic device and the user is relatively long, and thus the radiation power of the radiator can be adjusted into the rated radiation power to improve the communication efficiency of the electronic device.

In the above embodiments, the SAR sensor group including at least one SAR sensor is illustrated as an example. In fact, the SAR sensor group may also include zero SAR sensor, that is, no SAR sensor is arranged near the radiator corresponding to the SAR sensor group. Then, in one case, when only the radiator corresponding to the SAR sensor group including zero SAR sensor radiates antenna signals in a frequency band, the radiation power of the radiator may not be adjusted. In another case, when the radiator corresponding to the SAR sensor group including zero SAR sensor and the radiator corresponding to the SAR sensor group including a SAR sensor jointly radiate the antenna signals in a same frequency band, when a SAR sensor in the SAR sensor group including the SAR sensor is triggered, the corresponding power index identification can be acquired according to the identification bit of the SAR sensor group including the SAR sensor.

At step 102, target radiation power corresponding to the power index identification is acquired according to a first mapping relationship.

In this embodiment, in one case, the electronic device can directly store the mapping relationship between the power index identification and the target radiation power; in another case, because the electronic device stores an array including lots of target radiation power, in order to facilitate look-up, the serial number corresponding to the power index identification can first be acquired according to a first sub-mapping relationship, and then the target radiation power corresponding to the serial number can be acquired according to a second sub-mapping relationship.

At step 103, a corresponding radiator is determined according to a second mapping relationship and the SAR sensor group, and radiation power of the determined radiator is adjusted into the target radiation power.

Figure 2:
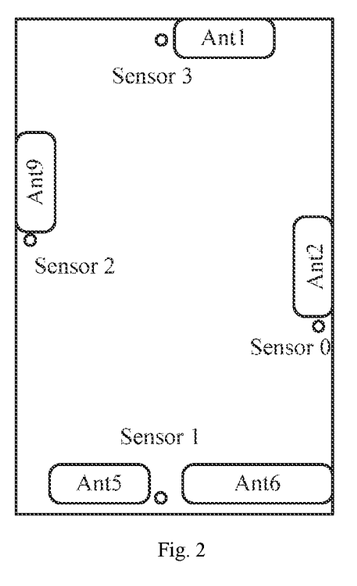
FIG. 2 is a schematic diagram illustrating arrangement of radiators and SAR sensor groups in an electronic device according to an exemplary embodiment.

In this embodiment, the second mapping relationship includes mapping relationship between the SAR sensor group and the radiator. As shown in FIG. 2, each radiator and each SAR sensor included in the electronic device can be grouped in advance, to make each radiator included in the corresponding SAR sensor group as illustrated in Table 1.

TABLE 1

| Radiator | Ant1 | Ant2 | Ant5 | Ant6 | Ant9 |
|---|---|---|---|---|---|
| SAR Sensor Group | Sensor 3 | Sensor 0 | Sensor 1 | Sensor 1 | Sensor 2 |

Assuming that the radiators of the electronic device include Ant1, Ant2, Ant5, Ant6, and Ant9, and the SAR sensor groups of the electronic device include Sensor 0, Sensor 1, Sensor 2, and Sensor 3. After grouping, Ant1 and Ant2 belong to Sensor 3 group, Ant5 belongs to Sensor 1 group, Ant6 belongs to Sensor 0 group, and Ant9 belongs to Sensor 2 group. In this way, the radiator corresponding to the triggered SAR sensor group can be acquired. In a case that the SAR sensor group corresponds to one radiator, the radiation power of the one radiator can be directly adjusted when the SAR sensor group is triggered. In a case that the SAR sensor group corresponds to a plurality of radiators, the radiation power of the plurality of radiators can be adjusted when the SAR sensor group is triggered. In other embodiments, the radiation power of the radiator in the plurality of radiators that radiates the antenna signals in a current working frequency band can be adjusted according to a third mapping relationship. The third mapping relationship includes a correspondence relationship between the radiators and the working frequency bands.

It can be seen from the above-mentioned embodiments that in the present disclosure, the mapping relationship between the radiators and the SAR sensor groups can be stored in advance, and the corresponding power index identification can be set for each SAR sensor group, so that the target radiation power can be found subsequently according to the power index identification, and then the radiation power of the radiator can be adjusted. Accordingly, the radiation power of each radiator can be adjusted when the SAR sensor group the radiator belongs to is triggered. Compared with the technical solutions in related technologies that the radiation power of all radiators is adjusted when any one of the SAR sensors is triggered, the technical solutions in the present disclosure can prevent the radiator whose SAR value does not exceed the standard from reducing the radiation efficiency, which can effectively improve the overall radiation efficiency of the electronic device. Compared with configuring the combinations of the SAR sensors in each possible application scenario through permutation and combination in the related technologies, the amount of data that needs to be configured in advance in present disclosure is reduced and storage requirements are reduced, which is beneficial to saving man-hours.

In order to describe the technical solutions of the present disclosure in detail, by taking current N77 frequency band and B1 frequency band of the electronic devices as examples, the power adjustment of the radiator will be described in detail hereinafter.

Figure 3:
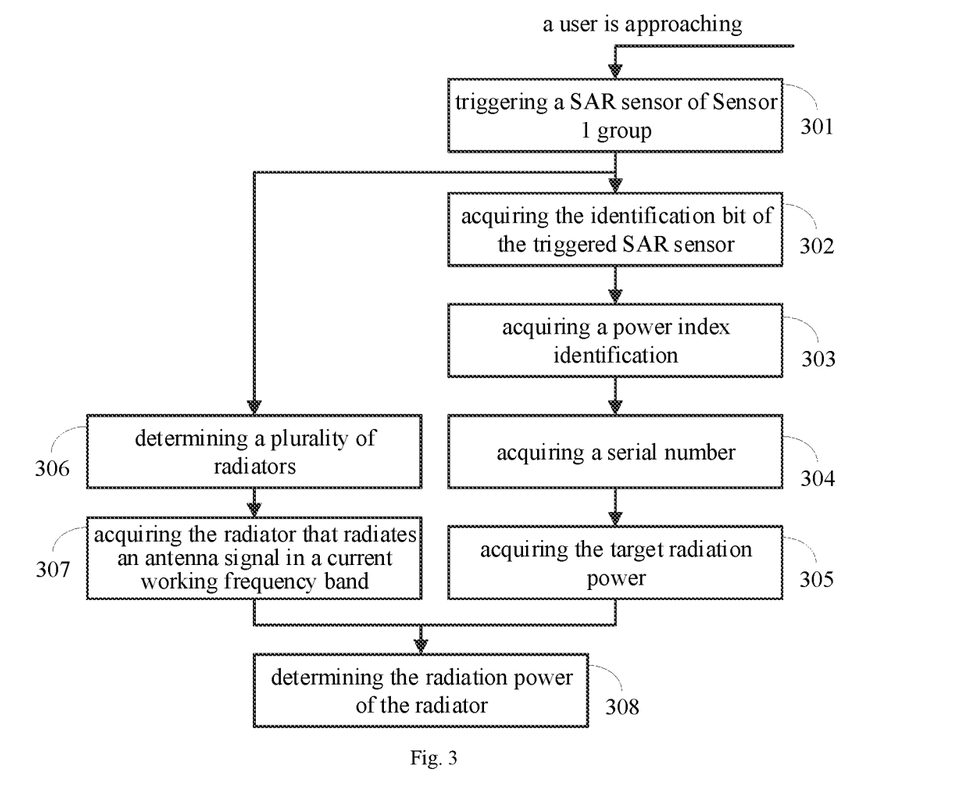
FIG. 3 is a flow chart illustrating another method for adjusting antenna radiation power according to an exemplary embodiment.

FIG. 3 is a flowchart of another method for adjusting antenna radiation power according to an exemplary embodiment of the present disclosure. As illustrated in FIG. 3, the method may include the following steps.

At step 301, it is detected that a SAR sensor of Sensor 1 group is triggered.

At step 302, the identification bit of the triggered SAR sensor is acquired.

In this embodiment, as shown in Table 2:

TABLE 2

| | Radiator | | | | | | | | | | | | | | |
|---|---|---|---|---|---|---|---|---|---|---|---|---|---|---|---|
| | Ant1 | | | Ant2 | | | Ant5 | | | Ant6 | | | Ant9 | | |
| | SAR Sensor Group | | | | | | | | | | | | | | |
| | Sensor 3 | | | Sensor0 | | | Sensor1 | | | Sensor 1 | | | Sensor 2 | | |
| | 2 mm | 5 mm | 15 mm | 2 mm | 5 mm | 15 mm | 2 mm | 5 mm | 15 mm | 2 mm | 5 mm | 15 mm | 2 mm | 5 mm | 15 mm |
| Power Index Identification | A31 | A32 | A33 | A01 | A02 | A03 | A11 | A12 | A13 | A11 | A12 | A13 | A21 | A22 | A23 | it is assumed that the radiators of the electronic device include Ant1, Ant2, Ant5, Ant6, and Ant9, the SAR sensor groups include Sensor 0, Sensor 1, Sensor 2 and Sensor 3, each SAR sensor group includes only one SAR sensor, each SAR sensor can include a distance threshold of 2 mm, a distance threshold of 5 mm, and a distance threshold of 15 mm, and in different distance thresholds, the SAR sensor corresponds to different identification bits. Therefore, when the SAR sensor included in each SAR sensor group is triggered at different distance thresholds, different identification bits can be obtained.

For example, as shown in Table 2, when the SAR sensor included in the Sensor 3 group is triggered at distance threshold of 2 mm, identification bit A32 can be obtained; when the SAR sensor included in the Sensor 3 group is triggered at distance threshold of 15 mm, identification bit A33 can be obtained; and the obtainment of identification bit of other SAR sensors can refer to the foregoing embodiments. When a plurality of SAR sensors are included in the same SAR sensor group, each SAR sensor can include identification bits at different distance thresholds, which will not be repeated herein.

At step 303, a power index identification of a triggered SAR sensor is acquired.

In this embodiment, the power index identification of the triggered SAR sensor can be determined according to the identification bit obtained in step 302.

In some cases, as shown in Table 3:

TABLE 3

| Identification Bit | A11 | A12 | A13 | A21 | A22 | A23 | A31 | A32 | A33 | A01 | A02 | A03 |
|---|---|---|---|---|---|---|---|---|---|---|---|---|
| Power Index Identification | 8 | 5 | 4 | 3 | 2 | 4 | 12 | 16 | 17 | 20 | 7 | 6 | the mapping relationship between the identification bits of each SAR sensor at different distance thresholds and each power index identification can be set, and the power index identification can be obtained subsequently by query of the table. In other cases, the power index identification array can be stored in the electronic device in advance, and then which number in the power index identification array sensor is the power index identification of the triggered SAR can be determined according the identification bit. For example, assuming that the power index identification array is {3, 4, 5, 6, 7, 8 . . . 9}, when the identification bit is A1, the first number in the power index identification array can be determined as power index identification; when the identification bit is A3, the third number in the power index identification array can be determined as power index identification. In some cases, the power index identifications corresponding to the identification bits of each SAR sensor at different distance thresholds can be made as a small array, and then small arrays of the SAR sensors can be integrated into a large array. In this way, the power index identification array is {{20, 7, 6}, {8, 5, 4}, {3, 2, 4}, {12, 16, 17}}. When the identification bit is A13, the third number of the first small array in the power index identification array can be determined as the power index identification of the triggered SAR sensor; when the identification bit is A33, the third number of the third small array in the power index identification array can be determined as the power index identification of the triggered SAR sensor; and so on, the power index identification corresponding to each identification bit can be obtained.

At step 304, a serial number is acquired according to the power index identification.

At step 305, the target radiation power is acquired according the serial number.

In this embodiment, as shown in the Table 4:

TABLE 4

| BAND | Ant_path | Distance | Sensor_index | DSI1 | DSI2 | DSI3 | DSI4 | ... | DSI20 |
|---|---|---|---|---|---|---|---|---|---|
| N77 | 5 | 2 mm | A11 | 22 | 22 | 21 | 21 | ... | 23 |
| N77 | 5 | 5 mm | A12 | 23 | 23 | 22 | 22 | ... | 24 |
| N77 | 5 | 15 mm | A13 | 24 | 24 | 23 | 23 | ... | 25 |
| N76 | 6 | 2 mm | A11 | 22 | 22 | 21 | 21 | ... | 23 |
| N76 | 6 | 5 mm | A12 | 21 | 22 | 20 | 24 | ... | 24 |
| N76 | 6 | 15 mm | A13 | 22 | 21 | 23 | 25 | ... | 25 |
| B1 | 9 | 2 mm | A22 | 21 | 22 | 222 | 24 | ... | 24 |
| B1 | 9 | 15 mm | A23 | 22 | 23 | 23 | 25 | ... | 25 |
| B1 | 9 | 15 mm | A23 | 22 | 23 | 23 | 25 | ... | 25 | assuming that the power index identification obtained according to the identification bit A12 is 5, then the serial number corresponding to the power index identification obtained according to the first sub-mapping relationship is DSI5, and the target radiation power corresponding to the serial number DSI5 obtained according to the second sub-mapping relationship is 23 dBm. In other words, in Table 5, the row where the target radiation power is located can be determined according to the identification bit, and then the column where the target radiation power is located can be determined according to the serial number. When the row position and the column position are both determined, the target radiation power can be determined.

In other cases, as shown in Table 5:

TABLE 5

| Identification Bit | A11 | A12 | A13 | A21 | A22 | A23 | A31 | A32 | A33 | A01 | A02 | A03 |
|---|---|---|---|---|---|---|---|---|---|---|---|---|
| Power Index Identification | DSI8 | DSI5 | DSI4 | DSI3 | DSI2 | DSI4 | DSI12 | DSI16 | DSI17 | DSI20 | DSI7 | DSI6 | after the identification bit of the triggered SAR sensor group is determined, the serial number can be determined according to the mapping relationship between the identification bit and the serial number in Table 5, and then the radiation power corresponding to the serial number can be obtained by looking up Table 4 according to the serial number. In the embodiment shown in Table 3, "power index identification" is an intermediate mapping value between "serial number" and "identification bit", and the intermediate mapping value has corresponding mapping relationships with "serial number" and "identification bit" respectively. In the embodiment shown in Table 5, "power index identification" is "serial number", that is, the mapping relationship between "identification bit" and "serial number" can be directly pre-stored. According to the mapping relationship between "identification bit" and "serial number", after the identification bit of the triggered SAR sensor is determined, "serial number" can be determined, and then the target radiation power can be determined. Compared with the embodiment shown in Table 3, in the embodiment shown in Table 5, an intermediate mapping value between "serial number" and "identification bit" can be omitted, which can simplify the indexing process and is beneficial to save processing resources.

At step 306, a plurality of radiators corresponding to the Sensor1 group are determined according to the second mapping relationship.

At step 307, the radiator in the plurality of radiators that radiates an antenna signal in a current working frequency band is determined according to the third mapping relationship.

At step 308, the radiation power of the radiator that radiates the antenna signal in a current working frequency band is adjusted into the target radiation power.

In this embodiment, because the correspondence relationship between the radiators and the SAR sensors is pre-stored in the electronic device, after the SAR sensor group to which the triggered SAR sensor belongs is determined, the radiator corresponding to the triggered SAR sensor can be determined according to Table 2, and further the radiation power of the determined radiator can be adjusted into the target radiation power.

In the case that the number of the determined radiators according to the triggered SAR sensor is multiple, the radiator of the plurality of radiators that radiates the antenna signal in the current working frequency band can be determined according to the third mapping relationship, and the radiation power of the radiator that radiates the antenna signal in a current working frequency band can be adjusted into the target radiation power. For example, the third mapping relationship between the radiators and the corresponding working frequency bands may be stored in the electronic device in advance, and the radiator in the electronic device that radiates the antenna signal in the current working frequency band may be determined, thus adjusting the radiation power of the radiator.

For example, as shown in Table 4, assuming that the Sensor 1 group includes one SAR sensor and the one SAR sensor is triggered at the distance threshold of 2 mm, the identification bit A11 of the SAR sensor can be obtained by looking up Table 1, then the power index identification that is 8 can be obtained by looking up Table 2, further the serial number is determined to be DSI8, and the target radiation power can be obtained as 21 dBm.

According to Table 2, it can be determined that the radiators corresponding to the SAR sensor include Ant5 and Ant6. Assuming that the current working frequency band is N77 frequency band, then according to the third mapping relationship between the working frequency bands and the radiators in Table 4, it can be determined that it is Ant5 that currently radiates the antenna signal in N77 frequency band, so that the radiation power of Ant5 can be adjusted into the target radiation power of 21 dBm.

Figure 4:
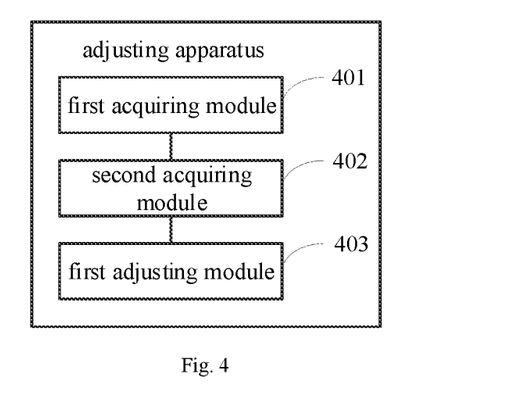
FIG. 4 is a block diagram of an apparatus for adjusting antenna radiation power according to an exemplary embodiment.

FIG. 4 is a block diagram of an apparatus for adjusting antenna radiation power according to an exemplary embodiment. As illustrated in FIG. 4, the apparatus includes a first acquiring module 401, a second acquiring module 402 and a first adjusting module 403.

The first acquiring module 401 is configured to acquire a power index identification of a triggered SAR sensor group.

The second acquiring module 402 is configured to acquire target radiation power corresponding to the power index identification according to a first mapping relationship.

The first adjusting module 403 is configured to determine a corresponding radiator according to a second mapping relationship and the SAR sensor group and adjust radiation power of the radiator into the target radiation power.

Figure 5:
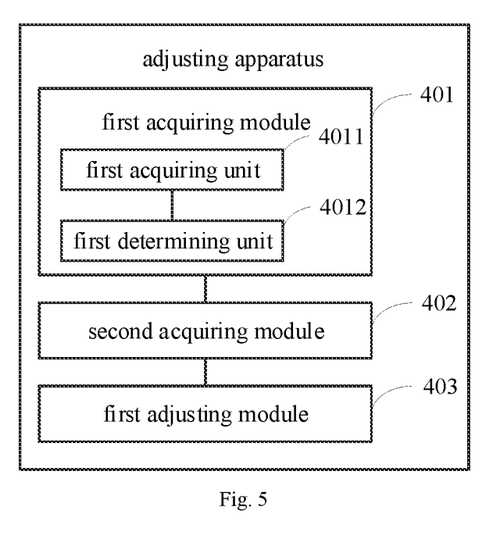
FIG. 5 is another block diagram of an apparatus for adjusting antenna radiation power according to an exemplary embodiment.

FIG. 5 is another block diagram of an apparatus for adjusting antenna radiation power according to an exemplary embodiment. In this embodiment, on the basis of the embodiment shown in the above FIG. 4, the first acquiring module 401 includes a first acquiring unit 4011 and a first determining unit 4012.

The first acquiring unit 4011 is configured to acquire an identification bit of the triggered SAR sensor group.

The first determining unit 4012 is configured to determine the power index identification corresponding to the SAR sensor group in a power index identification array according to the identification bit.

Figure 6:
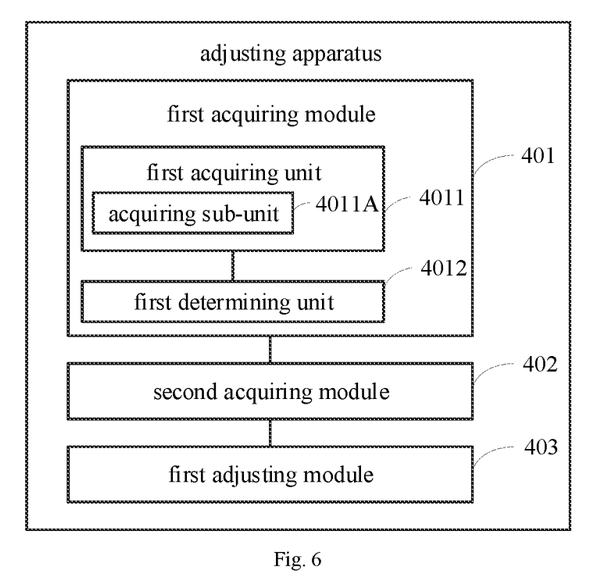
FIG. 6 is another block diagram of an apparatus for adjusting antenna radiation power according to an exemplary embodiment.

FIG. 6 is another block diagram of an apparatus for adjusting antenna radiation power according to an exemplary embodiment. In this embodiment, on the basis of the embodiment shown in the above FIG. 5, the SAR sensor group includes at least one SAR sensor, each SAR sensor includes one or more distance thresholds, and the distance thresholds and identification bits are in one-to-one correspondence. The first acquiring unit 4011 includes an acquiring sub-unit 4011A.

The acquiring sub-unit 4011A is configured to acquire the identification bit corresponding to the distance threshold according to a triggered distance threshold of the at least one SAR sensor.

Figure 7:
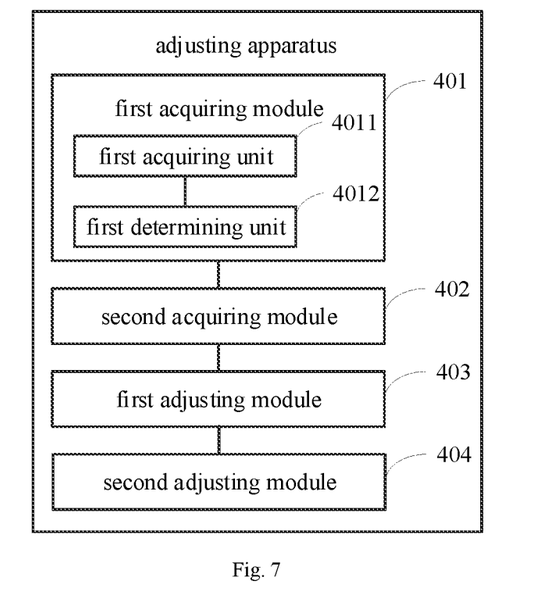
FIG. 7 is another block diagram of an apparatus for adjusting antenna radiation power according to an exemplary embodiment.

FIG. 7 is another block diagram of an apparatus for adjusting antenna radiation power according to an exemplary embodiment. On the basis of the embodiment shown in the above FIG. 5, this embodiment further includes a second adjusting module 404.

The second adjusting module 404 is configured to adjust the radiation power of the radiator into rated radiation power in a case that the SAR sensor included in the SAR sensor group is not triggered.

It should be noted that the structure of the second adjusting module 403 in the apparatus embodiment shown in FIG. 7 may also be included in the apparatus embodiment shown in FIG. 6, which is not limited in the present disclosure.

Figure 8:
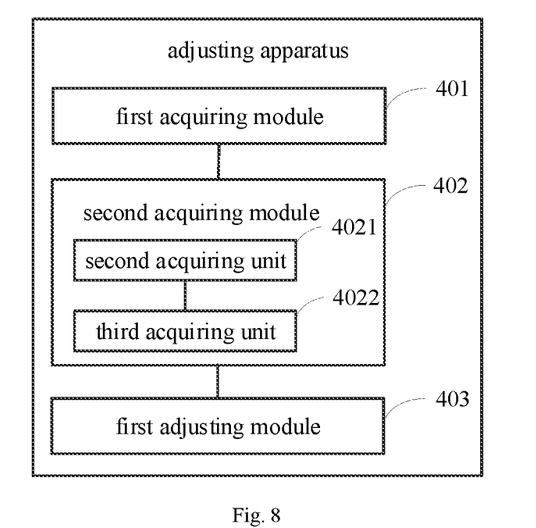
FIG. 8 is another block diagram of an apparatus for adjusting antenna radiation power according to an exemplary embodiment.

FIG. 8 is another block diagram of an apparatus for adjusting antenna radiation power according to an exemplary embodiment. In this embodiment, on the basis of the embodiment shown in the above FIG. 4, the second acquiring module 402 includes a second acquiring unit 4021 and a third acquiring unit 4022.

The second acquiring unit 4021 is configured to acquire a serial number corresponding to the power index identification according to a first sub-mapping relationship.

The third acquiring unit 4022 is configured to acquire the target radiation power corresponding to the serial number according to a second sub-mapping relationship.

It should be noted that the structures of the second acquiring unit 4021 and the third acquiring unit 4022 in the apparatus embodiment shown in FIG. 8 may also be included in any one of apparatus embodiments shown in FIG. 5-FIG. 7, which is not limited in the present disclosure.

Figure 9:
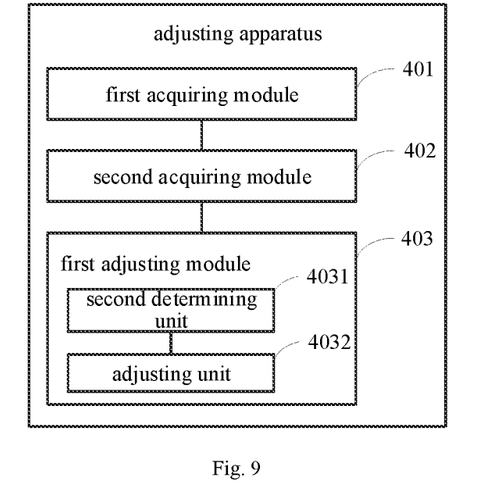
FIG. 9 is another block diagram of an apparatus for adjusting antenna radiation power according to an exemplary embodiment.

FIG. 9 is another block diagram of an apparatus for adjusting antenna radiation power according to an exemplary embodiment. In this embodiment, on the basis of the embodiment shown in the above FIG. 4, in a case that the SAR sensor group corresponds to a plurality of radiators, the first adjusting module 403 includes a second determining unit 4031 and an adjusting unit 4032.

The second determining unit 4031 is configured to determine the plurality of radiators corresponding to the SAR sensor group according to the second mapping relationship.

The adjusting unit 4032 is configured to adjust the radiation power of the radiator of the plurality of radiators that radiates an antenna signal in a current working frequency band, according to a third mapping relationship, the third mapping relationship including a correspondence relationship between the radiators and working frequency bands.

It should be noted that the structures of the second determining unit 4031 and the adjusting unit 4032 in the apparatus embodiment shown in FIG. 9 may also be included in any one of apparatus embodiments shown in FIG. 5-FIG. 8, which is not limited in the present disclosure.

Regarding the apparatuses in the foregoing embodiment, the specific manner in which each module performs operation has been described in detail in the related method embodiment, and detailed description will not be provided herein.

As for the apparatus embodiments, because these embodiments substantially correspond to the method embodiments, the relevant parts can refer to the description of the method embodiments. The apparatus embodiments described above are merely illustrative, wherein the units described as separate components may or may not be physically separated, and the components shown as units may or may not be physical units, that is, they may be located in one place, or they may be distributed to multiple network units. Some or all of the modules can be selected according to actual needs to achieve the objectives of the present disclosure. Those of ordinary skill in the art can understand and implement the technical solutions of the present disclosure without creative work.

Correspondingly, the present disclosure also provides a device for adjusting antenna radiation power. The device comprises a processor and a memory for storing instructions executable by the processor, wherein the processor is configured for acquiring a power index identification of a triggered SAR sensor group; acquiring target radiation power corresponding to the power index identification according to a first mapping relationship; and determining a corresponding radiator according to a second mapping relationship and the SAR sensor group and adjusting radiation power of the radiator into the target radiation power.

Correspondingly, the present disclosure also provides a terminal which comprises a memory and one or more programs which is stored in the memory. After configuration, one or more programs executed by one or more processors include the instructions for implementing the following operations: acquiring a power index identification of a triggered SAR sensor group; acquiring target radiation power corresponding to the power index identification according to a first mapping relationship; and determining a corresponding radiator according to a second mapping relationship and the SAR sensor group and adjusting radiation power of the radiator into the target radiation power.

Figure 10:
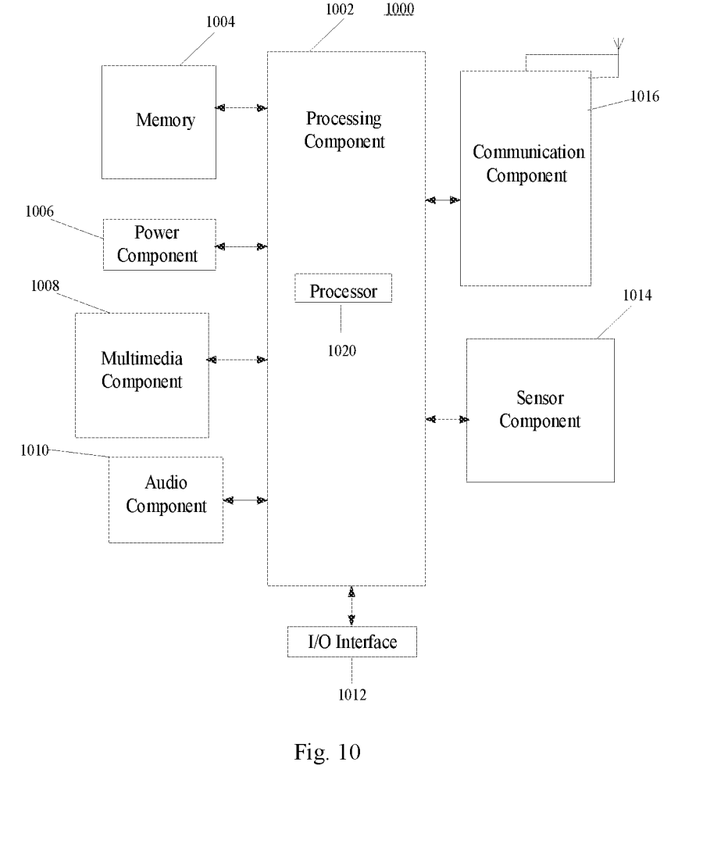
FIG. 10 is a block diagram of a device for adjusting antenna radiation power according to an exemplary embodiment.

FIG. 10 is a block diagram of a device 1000 for adjusting antenna radiation power according to an exemplary embodiment. For example, the device 1000 may be a mobile phone, a computer, a digital broadcast terminal, a messaging device, a gaming console, a tablet, a medical device, exercise equipment, a personal digital assistant, and the like.

Referring to FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the device 1000.

The multimedia component 1008 includes a screen providing an output interface between the device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive an external multimedia datum while the device 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone ("MIC") configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the device 1000. For instance, the sensor component 1014 may detect an open/closed status of the device 1000, relative positioning of components, e.g., the display and the keypad, of the device 1000, a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the device 1000 and other devices. The device 1000 can access a wireless network based on a communication standard, such as WiFi, 2G or 3G or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1004, executable by the processor 1020 in the device 1000, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for adjusting antenna radiation power, comprising:
   acquiring a power index identification of a triggered SAR sensor group;
   adjusting the radiation power of the radiator into rated radiation power, in a case that the SAR sensor included in the SAR sensor group is not triggered;
   acquiring target radiation power corresponding to the power index identification according to a first mapping relationship; and
   determining a corresponding radiator according to a second mapping relationship and the SAR sensor group and adjusting radiation power of the radiator into the target radiation power.

2. The method of claim 1, wherein acquiring the power index identification of the triggered SAR sensor group comprises:
   acquiring an identification bit of the triggered SAR sensor group; and
   determining the power index identification corresponding to the SAR sensor group in a power index identification array according to the identification bit.

3. The method of claim 2, wherein the SAR sensor group includes at least one SAR sensor, each SAR sensor includes one or more distance thresholds, and the distance thresholds and identification bits are in one-to-one correspondence;
   acquiring the identification bit of the triggered SAR sensor of the at least one SAR sensor comprises:
   according to a triggered distance threshold of the at least one SAR sensor, acquiring the identification bit corresponding to the distance threshold.

4. The method of claim 1, wherein acquiring the target radiation power corresponding to the power index identification according to the first mapping relationship comprises:
   acquiring a serial number corresponding to the power index identification according to a first sub-mapping relationship; and
   acquiring the target radiation power corresponding to the serial number according to a second sub-mapping relationship.

5. The method of claim 1, wherein in a case that the SAR sensor group corresponds to a plurality of radiators, determining the corresponding radiator according to the second mapping relationship and the SAR sensor group and adjusting radiation power of the radiator into the target radiation power comprises:
   determining the plurality of radiators corresponding to the SAR sensor group according to the second mapping relationship; and
   adjusting the radiation power of the radiator of the plurality of radiators that radiates an antenna signal in a current working frequency band, according to a third mapping relationship, the third mapping relationship including a correspondence relationship between the radiators and working frequency bands.

6. A non-transitory computer readable storage medium, stored therein with computer instructions that when executed by a processor, operations for adjusting antenna radiation power are implemented, the operations comprising:
   acquiring a power index identification of a triggered SAR sensor group;
   adjusting the radiation power of the radiator into rated radiation power, in a case that the SAR sensor included in the SAR sensor group is not triggered;

acquiring target radiation power corresponding to the power index identification according to a first mapping relationship; and determining a corresponding radiator according to a second mapping relationship and the SAR sensor group and adjusting radiation power of the radiator into the target radiation power.

7. The storage medium of claim 6, wherein acquiring the power index identification of the triggered SAR sensor group comprises:

acquiring an identification bit of the triggered SAR sensor group; and determining the power index identification corresponding to the SAR sensor group in a power index identification array according to the identification bit.

8. The storage medium of claim 7, wherein the SAR sensor group includes at least one SAR sensor, each SAR sensor includes one or more distance thresholds, and the distance thresholds and identification bits are in one-to-one correspondence;

acquiring the identification bit of the triggered SAR sensor of the at least one SAR sensor comprises:

according to a triggered distance threshold of the at least one SAR sensor, acquiring the identification bit corresponding to the distance threshold.

9. The storage medium of claim 6, wherein acquiring the target radiation power corresponding to the power index identification according to the first mapping relationship comprises:

acquiring a serial number corresponding to the power index identification according to a first sub-mapping relationship; and acquiring the target radiation power corresponding to the serial number according to a second sub-mapping relationship.

10. The storage medium of claim 6, wherein in a case that the SAR sensor group corresponds to a plurality of radiators, determining the corresponding radiator according to the second mapping relationship and the SAR sensor group and adjusting radiation power of the radiator into the target radiation power comprises:

determining the plurality of radiators corresponding to the SAR sensor group according to the second mapping relationship; and adjusting the radiation power of the radiator of the plurality of radiators that radiates an antenna signal in a current working frequency band, according to a third mapping relationship, the third mapping relationship including a correspondence relationship between the radiators and working frequency bands.

11. An electronic device, comprising:
a processor and
a memory configured to store instructions executable by the processor,
wherein the processor is configured to:
acquire a power index identification of a triggered SAR sensor group;
adjust the radiation power of the radiator into rated radiation power, in a case that the SAR sensor included in the SAR sensor group is not triggered;
acquire target radiation power corresponding to the power index identification according to a first mapping relationship; and
determine a corresponding radiator according to a second mapping relationship and the SAR sensor group and adjust radiation power of the radiator into the target radiation power.

12. The electronic device of claim 11, wherein the processor is configured to:
acquire an identification bit of the triggered SAR sensor group; and
determine the power index identification corresponding to the SAR sensor group in a power index identification array according to the identification bit.

13. The electronic device of claim 12, wherein the SAR sensor group includes at least one SAR sensor, each SAR sensor includes one or more distance thresholds, and the distance thresholds and identification bits are in one-to-one correspondence;
the processor is configured to:
according to a triggered distance threshold of the at least one SAR sensor, acquire the identification bit corresponding to the distance threshold.

14. The electronic device of claim 11, wherein the processor is configured to:
acquire a serial number corresponding to the power index identification according to a first sub-mapping relationship; and
acquire the target radiation power corresponding to the serial number according to a second sub-mapping relationship.

15. The electronic device of claim 11, wherein in a case that the SAR sensor group corresponds to a plurality of radiators, the processor is configured to:
determine the plurality of radiators corresponding to the SAR sensor group according to the second mapping relationship; and
adjust the radiation power of the radiator of the plurality of radiators that radiates an antenna signal in a current working frequency band, according to a third mapping relationship, the third mapping relationship including a correspondence relationship between the radiators and working frequency bands.

* * * * *